United States Patent
Song et al.

(10) Patent No.: US 9,891,764 B2
(45) Date of Patent: Feb. 13, 2018

(54) TOUCH SCREEN PANEL

(71) Applicant: LG Display Co., Ltd., Seoul (KR)

(72) Inventors: MoonBong Song, Seoul (KR); DeukSu Lee, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 41 days.

(21) Appl. No.: 14/574,167

(22) Filed: Dec. 17, 2014

(65) Prior Publication Data

US 2015/0185917 A1 Jul. 2, 2015

(30) Foreign Application Priority Data

Dec. 26, 2013 (KR) ........................ 10-2013-0163953

(51) Int. Cl.
*G06F 3/044* (2006.01)
(52) U.S. Cl.
CPC .... *G06F 3/044* (2013.01); *G06F 2203/04103* (2013.01)
(58) Field of Classification Search
None
See application file for complete search history.

(56) References Cited

U.S. PATENT DOCUMENTS

| | | | | |
|---|---|---|---|---|
| 2009/0194344 A1* | 8/2009 | Harley | ................. | G06F 3/044 178/18.06 |
| 2010/0110023 A1* | 5/2010 | Chien | ................. | G02B 5/201 345/173 |
| 2010/0149117 A1* | 6/2010 | Chien | ................. | G06F 3/0412 345/173 |
| 2010/0182275 A1 | 7/2010 | Saitou | | |
| 2013/0147730 A1* | 6/2013 | Chien | ................. | G06F 3/0412 345/173 |
| 2014/0327846 A1* | 11/2014 | Hata | ................. | G06F 3/041 349/12 |
| 2015/0062457 A1* | 3/2015 | Kida | ................. | G06F 3/044 349/12 |

FOREIGN PATENT DOCUMENTS

| | | |
|---|---|---|
| CN | 102541355 | 7/2012 |
| CN | 102662544 | 9/2012 |
| TW | 201019192 | 5/2010 |

OTHER PUBLICATIONS

Office Action for Chinese Patent Application No. CN 201410858192.X, dated Apr. 1, 2017, 15 Pages.
$2^{nd}$ Office Action for Chinese Patent Application No. CN 201410858192.X, dated Dec. 12, 2017, 20 Pages. (With English Translation).

* cited by examiner

*Primary Examiner* — Bryan Earles
(74) *Attorney, Agent, or Firm* — Fenwick & West LLP

(57) ABSTRACT

A touch screen panel includes a substrate and a black matrix located on the substrate in a mesh pattern. On the black matrix are formed a first touch sense electrode and a second sense electrode. The first touch sense electrode extends in a first direction and the second touch sense electrode has a plurality of blocks extending in a second direction. An insulation layer with openings exposes portions of the blocks of the second touch sense electrode. A connection electrode connects the adjacent blocks of the second touch sense electrode via the openings in the insulation layer. The first touch sense electrode and the second touch sense electrode are covered by the pattern of the black matrix.

18 Claims, 8 Drawing Sheets

TOUCH SCREEN PANEL

CROSS-REFERENCE TO RELATED APPLICATIONS

This application claims the priority of Korean Patent Application No. 10-2013-0163953 filed on Dec. 26, 2013 in the Korean Intellectual Property Office, the disclosure of which is incorporated herein by reference.

BACKGROUND

Technical Field

The present disclosure relates to a touch screen panel and a method of manufacturing the same. More particularly, the present disclosure relates to a metal-mesh-type touch screen panel with improved visibility and contrast ratio, and a method of manufacturing the same.

Description of the Related Art

A touch screen panel is a device that recognizes a touch or a gesture on its screen as input information. Such a touch screen panel is increasingly used in personal portable electronic devices such as smart phones and tablet PCs. Typically, a touch screen panel is disposed close to a device that displays images, such as a display panel, facilitating a user to touch images displayed on the display panel.

Generally, a touch screen panel includes touch sense electrodes for sensing a user's touch input. As touch sense electrodes, transparent electrodes made of a transparent, conductive material such as Indium Tin Oxide (ITO) are used to allow a user to see images displayed on its display panel through the transparent electrodes.

SUMMARY

ITO, which is used as the material for touch sense electrodes of a touch screen panel, is less flexible than metal materials. Accordingly, when a touch screen panel that uses ITO as the material for its touch sense electrodes is implemented in a flexible display device, cracks may occur in ITO. This may result in defects in the touch screen panel. Further, ITO has larger surface resistance than that of metal materials. Accordingly, when a touch screen panel that uses ITO as the material for its touch sense electrodes is implemented in a large-scale display device, there may be a problem in driving the touch screen panel due to the larger surface resistance. In addition, transparent, conductive oxide such as ITO has low transmittivity. Moreover, ITO is a rare material and thus is expensive to purchase. This may increase the cost for manufacturing a touch screen panel itself. Under the circumstances, one or more embodiments of this disclosure comprise a novel touch screen panel, that is, a metal-mesh-type touch screen panel, as well as a method of manufacturing the same. The metal-mesh-type touch screen panel overcomes the above-mentioned problems arising in a touch screen panel that uses ITO as the material for touch sense electrodes.

Incidentally, when a display device is fabricated in such a manner that a display panel and a touch screen panel are separately produced and then they are attached together, the thickness of the display device is increased since it requires an additional substrate during the processing of the touch screen panel. Thus, cost for manufacturing is increased along with difficulty in the manufacturing process. Further, it may not be beneficial in terms of design. In view of this, some embodiments disclose a novel touch screen panel that can be integrated with a display panel, as well as a method of manufacturing the same.

An object of the present disclosure is to provide a metal-mesh-type touch screen panel with improved visibility and contrast ratio, and a method of manufacturing the same.

Another object of the present disclosure is to provide a touch screen panel that can be produced integrally with a usable color filter in producing a display panel, and a method of manufacturing the same.

It should be noted that objects of the present disclosure are not limited to the forgoing objects, and other unmentioned objects of the present disclosure will be apparent to those skilled in the art from the following descriptions.

According to an exemplary embodiment of the present disclosure, there is provided a touch screen panel having first and second touch sense electrodes formed on the same plane. A black matrix is located on a substrate in a mesh pattern. The first and second touch sense electrodes are located on the black matrix. The first touch sense electrode extends in a first direction and the second touch sense electrode has a plurality of blocks extending in a second direction. An insulation layer with openings exposes portions of the blocks of the second touch sense electrode. A connection electrode connects the adjacent blocks of the second touch sense electrode via the openings in the insulation layer. The first and second touch sense electrodes are covered by the pattern of the black matrix. According to the exemplary embodiment of the present disclosure, the black matrix is formed in a mesh pattern, and the first sense electrode and the blocks of the second sense electrode are covered by the pattern of the black matrix. Accordingly, it is possible to prevent external light from being reflected on the first and second touch sense electrodes. Further, the contrast ratio can be improved. In addition, the first and second touch sense electrodes are covered by the black matrix and thus are invisible to a user, thereby improving the visibility.

In some embodiments, the first touch sense electrode and each of the plurality of blocks in the second touch sense electrode include a plurality of electrode branches, in which at least some of the electrode branches have a different length from other electrode branches.

In some embodiments, the electrode branches of the first touch sense electrode are insulated from the electrode branches of the blocks in the second touch sense electrode.

In some embodiments, at least one of the branches in the block of the second touch sense electrode has the exposed portion via the openings in the insulation layer.

In some embodiments, the first and second touch sense electrodes are located on the same plane.

In some embodiments, the first and second touch sense electrodes are interposed between the black matrix and the insulation layer, and wherein the connection electrode is on the insulation layer.

In some embodiments, the connection electrode is interposed between the black matrix and the insulation layer, and wherein the first and second touch sense electrodes are on the insulation layer.

In some embodiments, the insulation layer has substantially a same pattern as the mesh pattern of the black matrix.

In some embodiments, the insulation layer has a pattern that exposes at least some portion of the second touch sense electrode other than the openings.

In some embodiments, the insulation layer is positioned only at an area where the first touch sense electrode and the connection electrode overlap each other to insulate the first electrode from the connecting electrode.

In some embodiments, a width of the black matrix is equal to or larger than a width of the first touch sense electrode and equal to or larger than a width of the second touch sense electrode.

In some embodiments, the first and second touch sense electrodes, and the connection electrode are made of a metal material.

In some embodiments, the connection electrode overlaps, in part, the mesh pattern of the black matrix.

According to an exemplary embodiment of the present disclosure, there is provided a touch screen panel having first and second touch sense units formed on different planes. A black matrix is located on a substrate in a mesh pattern. A first touch sense unit comprises a plurality of first sense electrodes extending in a first direction. A second touch sense unit comprises a plurality of second touch sense electrodes extending in a second direction. An insulation layer is interposed between the first and second touch sense units. The first and second touch sense units are covered under the pattern of the black matrix. According to the exemplary embodiment of the present disclosure, the black matrix is formed in a mesh pattern. The plurality of first sense electrodes of the first touch sense unit and the plurality of second sense electrodes of the second touch sense unit are covered under the pattern of the black matrix. Accordingly, it is possible to reduce external light from being reflected on the first and second touch sense units by the black matrix. By doing so, it is possible to prevent the first and second touch sense units from being visible to a user. Therefore, the contrast ratio and visibility can be improved.

In some embodiments, each of the first and second touch sense electrodes includes a plurality of electrode branches, a subset of the plurality of electrode branches having different lengths from each other.

In some embodiments, the insulation layer has the same pattern as the mesh pattern of the black matrix.

In some embodiments, the insulation layer exists in an area where the first and second touch sense electrodes and the second touch sense electrodes overlap each other.

In some embodiments, a pattern of the first touch sense unit and a pattern of the second touch sense unit collectively form the substantially the same pattern of the black matrix.

In some embodiments, a width of the black matrix is equal to or larger than a width of the first touch sense electrode and a width of the second touch sense electrode.

In some embodiments, the first and second touch sense electrodes are made of a metal material.

An embodiment of the present disclosure discloses a method of manufacturing a touch screen panel. The method of manufacturing a touch screen panel includes forming a black matrix on the substrate in a mesh pattern; forming first touch sense electrodes and second touch sense electrodes to overlap, in part, with the pattern of the black matrix, the first touch sense electrodes extending in a first direction and the second touch sense electrodes including a plurality of blocks; forming an insulation layer having openings exposing at least a portion of the second touch sense electrodes; and forming connection electrodes on the insulation layer, the connection electrodes electrically connecting between adjacent blocks in each of the second touch sense electrodes via the openings in the insulation layer.

In some embodiments, the step of forming the insulation layer includes patterning the insulation layer to correspond to the mesh pattern of the black matrix.

Particulars of various exemplary embodiments of the present disclosure are included in the detailed description and the accompanying drawings.

BRIEF DESCRIPTION OF THE DRAWINGS

The above and other aspects, features and advantages of the present disclosure will be more clearly understood from the following detailed description taken in conjunction with the accompanying drawings, in which.

DETAILED DESCRIPTION OF THE PREFERRED EMBODIMENT

Figure 1A:
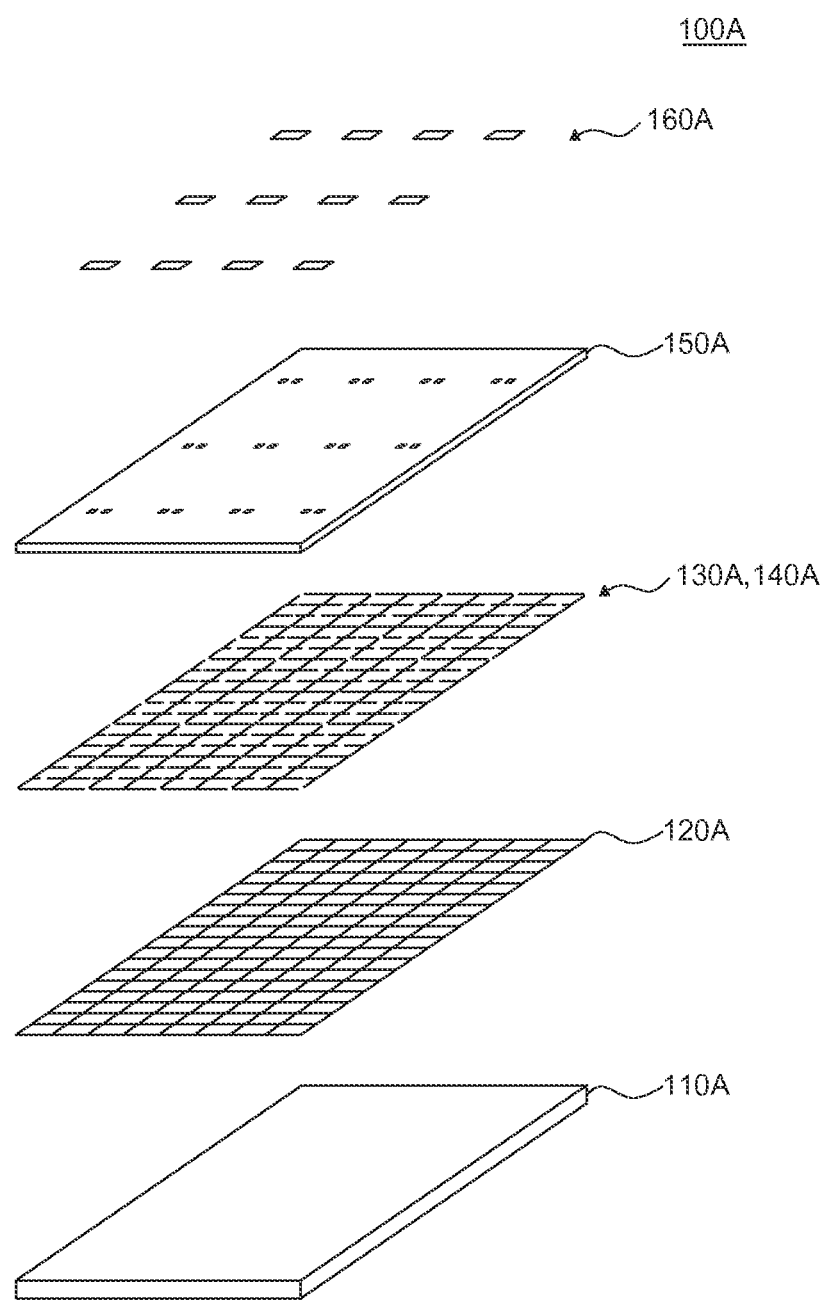
FIG. 1A is an exploded perspective view of a touch screen panel having first and second touch sense units formed on the same plane, according to an exemplary embodiment of the present disclosure.

Various advantages and features of the present disclosure and accompanying methods will become apparent from the following description of embodiments with reference to the accompanying drawings. However, the present embodiments are not limited to the instant disclosure but will be implemented in various forms. The exemplary embodiments are provided by way of example only so that a person with ordinary skill in the art can fully understand the disclosures and scope of the present disclosure. Therefore, the present disclosure will be defined only by the scope of the appended claims.

Indicating that elements or layers are "on" other elements or layers include both a case in which the corresponding elements are just above other elements and a case in which the corresponding elements are intervened with other layers or elements.

Although first, second, and the like are used in order to describe various components, the components are not limited by the terms. The above terms are used only to discriminate one component from the other component. Therefore, the first component mentioned below may be a second component within the technical spirit of the present disclosure.

The same reference numerals indicate the same elements throughout the specification.

In the drawings, size and thickness of each element are arbitrarily illustrated for convenience of description, and the present disclosure is not necessarily limited to those illustrated in the drawings.

The components of various embodiments of the present disclosure can be partially or entirely bonded to or combined with each other and can be interlocked and operated in technically various ways. The present disclosure can be fully understood by a person with ordinary skill in the art and the embodiments can be carried out independently of or in association with each other.

Hereinafter, various embodiments of the present disclosure will be described in detail with reference to the accompanying drawings.

FIG. 1A is an exploded perspective view for illustrating a touch screen panel having first and second touch sense units formed on the same plane, according to an exemplary embodiment of the present disclosure. Referring to FIG. 1A, a touch screen panel 100A includes a substrate 110A, a black matrix 120A, a first touch sense unit comprising a plurality of first sense electrodes 130A, a second touch sense unit comprising a plurality of second sense electrodes 140A, an insulation layer 150A, and a plurality of connection electrodes 160A. In FIG. 1A, for the purpose of simplicity, thicknesses and widths of the black matrix 120A, the plurality of first sense electrodes 130A, the plurality of second sense electrodes 140A and the connection electrodes 160A are omitted therefrom.

Figure 1B:
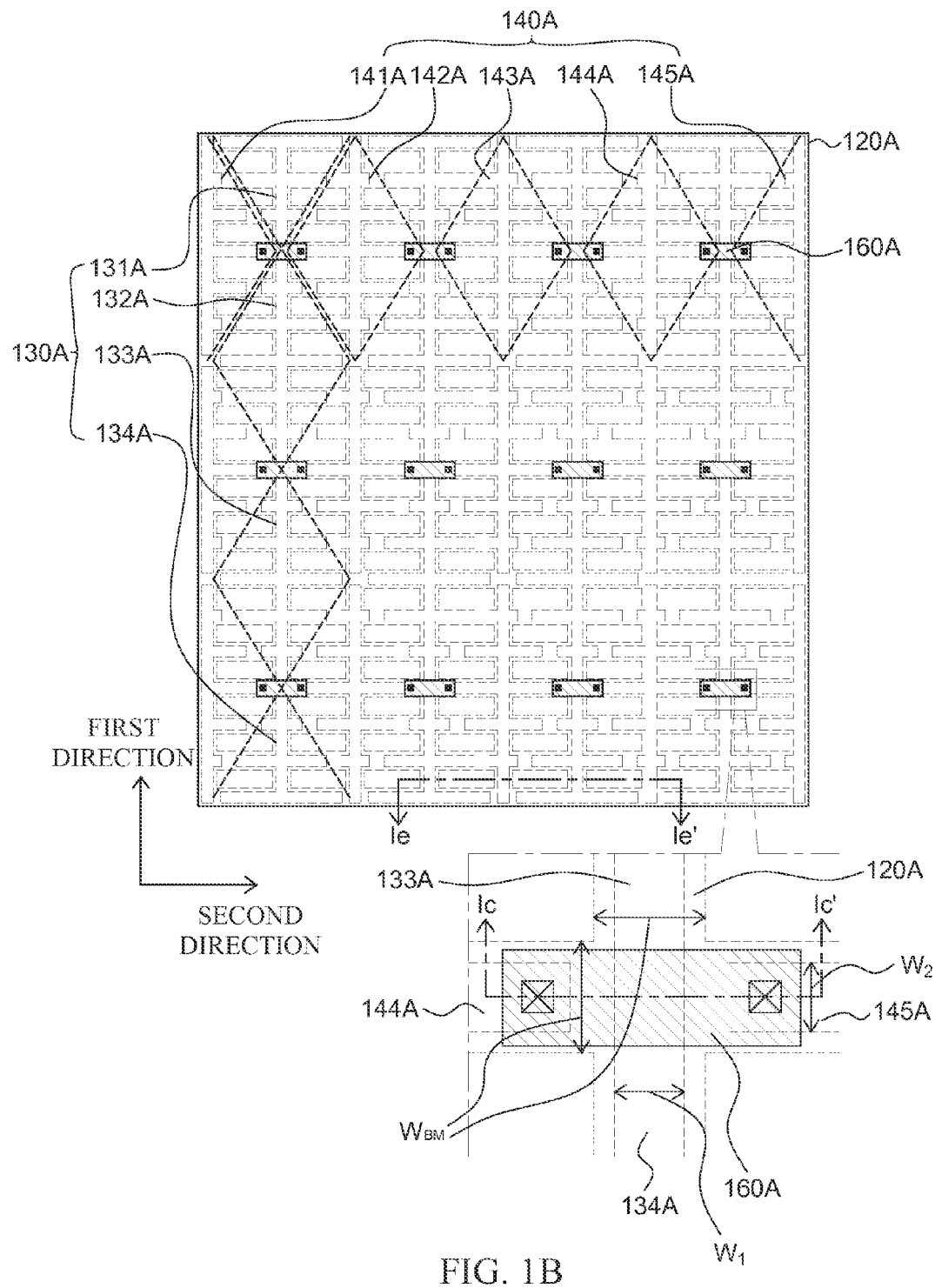
FIG. 1B is a pair of views, one of which is a plan view of the touch screen panel illustrated in FIG. 1A and the other of which is an enlarged view of a portion thereof.
Figure 1C:
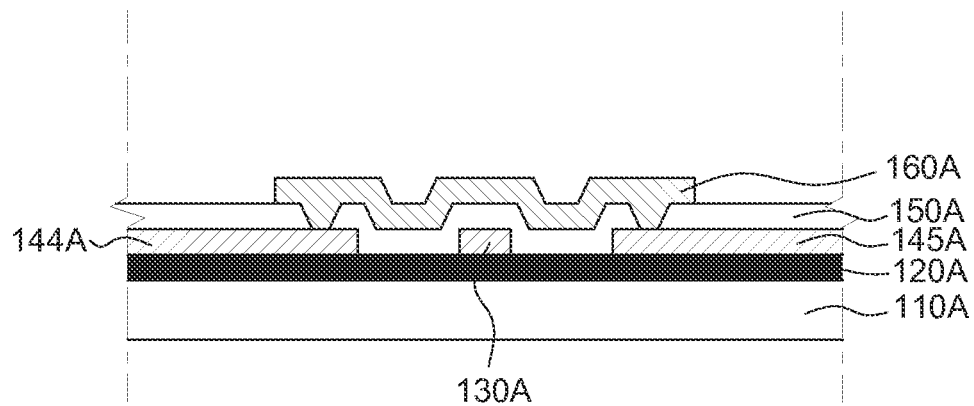
FIG. 1C is a cross-sectional view of the touch screen panel taken along the line Ic-Ic' of FIG. 1B illustrating the first and second touch sense units, and the connection electrodes.

Referring to FIG. 1A, the black matrix 120A is formed on the substrate 110A in a mesh pattern. The plurality of first sense electrodes 130A of the first sense unit and the plurality of second sense electrodes 140A of the second sense unit are formed on the black matrix 120A. The plurality of first sense electrodes 130A and the plurality of second sense electrodes 140A are formed on the same plane. The insulation layer 150A is on the plurality of first sense electrodes 130A and the plurality of second sense electrodes 140A. On the insulation layer 150A is formed the plurality of connection electrodes 160A. Reference is made to FIGS. 1B and 1C in order to describe in more detail the substrate 110A, the black matrix 120A, the plurality of first sense electrodes 130A, the plurality of second sense electrodes 140A, the insulation layer 150A, and the plurality of connection electrodes 160A.

FIG. 1B is a pair of views, one of which is a plan view of the touch screen panel illustrated in FIG. 1A and the other of which is an enlarged view of a portion thereof. FIG. 1C is a cross-sectional view of the touch screen panel taken along the line Ic-Ic' of FIG. 1B for illustrating the plurality of first sense electrodes 130A, the plurality of second sense electrodes 140A, the insulation layer 150A and the connection electrodes 160A. In FIG. 1B, for the purpose of simplicity, the substrate 110A and the insulation layer 150A are omitted. Further, the connection electrodes 160A disposed on the insulation layer 150A are indicated by solid lines with hatched lines therein. The plurality of first sense electrodes 130A, the plurality of second sense electrodes 140A, and the black matrix 120A disposed under the insulation layer 150A are indicated by dashed lines.

On the substrate 110A is formed the black matrix 120A. Referring to FIG. 1B, the black matrix is formed in a mesh pattern. The black matrix 120A is made of an opaque insulating material. The width $W_{BM}$ of strands of the mesh pattern of the black matrix 120A is constant throughout the mesh pattern of the black matrix 120A.

On the black matrix 120A is formed the plurality of first sense electrodes 130A of the first touch sense unit. The plurality of first sense electrodes 130A is made of a metal material. Each of the plurality of first sense electrodes 130A of the first touch sense unit is formed in a mesh pattern. The plurality of first sense electrodes 130A includes a plurality of blocks 131A, 132A, 133A, and 134A, each of which is formed in a mesh pattern. Referring to FIG. 1B, each of the plurality of first sense electrodes 130A (e.g., comprising blocks 131A, 132A, 133A, and 134A) of the first touch sense unit is formed in a mesh pattern within their respective triangular or diamond areas indicated by dashed lines. The width $W_1$ of the strands of the mesh pattern of the plurality of first sense electrodes 130A is constant throughout the mesh pattern of the plurality of first sense electrodes 130A.

Each of the plurality of first sense electrodes 130A of the first touch sense unit is extended in a first direction. For example, as illustrated in FIG. 1B, each of the plurality of first sense electrodes 130A of the first touch sense unit is extended in the vertical direction.

The shape of the mesh pattern of the plurality of first sense electrodes 130A corresponds to the shape of the mesh pattern of the black matrix 120A in contact with the plurality of first sense electrodes 130A thereunder. Accordingly, the shape of the mesh pattern of the plurality of first sense electrodes 130A is identical to that of the mesh pattern of the black matrix 120A.

The width $W_{BM}$ of the mesh pattern of the black matrix 120A is equal to or larger than that of the mesh pattern of the plurality of first sense electrodes 130A formed on the black matrix 120A. Accordingly, the entirety of the mesh pattern of the plurality of first sense electrodes 130A is overlapped on and within the mesh pattern of the black matrix 120A. In FIG. 1B, the width of the strands of the mesh pattern of the plurality of first sense electrodes 130A is represented by the width $W_1$.

On the black matrix 120A is formed the plurality of second sense electrodes 140A of the second touch sense unit. The plurality of second sense electrodes 140A is made of a metal material which is the same material as that of the plurality of first sense electrodes 130A. The plurality of first sense electrodes 130A and the plurality of second sense electrodes 140A are formed on the black matrix 120A so that they come in contact with the black matrix 120A. Accordingly, the plurality of first sense electrodes 130A and the plurality of second sense electrodes 140A are formed on the same plane.

The plurality of second sense electrodes 140A includes a plurality of blocks 141A, 142A, 143A, 144A and 145A, each of which is formed in a mesh pattern. Referring to FIG. 1B, each of the plurality of blocks 141A, 142A, 143A, 144A and 145A of the plurality of second sense electrodes 140A is formed in a mesh pattern within their respective triangular or diamond areas indicated by dashed lines. The width $W_2$ of the strands of mesh pattern of the plurality of second sense electrodes 140A is constant throughout the mesh pattern of the plurality of second sense electrodes 140A.

Since the plurality of first sense electrodes 130A and the plurality of second sense electrodes 140A are formed on the same plane, a short circuit may be created between them. In order to prevent such a short circuit, therefore, the blocks 141A, 142A, 143A, 144A and 145A of the plurality of second sense electrodes 140A are formed separately from one another in a second direction. For example, as illustrated in FIG. 1B, the blocks 141A, 142A, 143A, 144A and 145A of the plurality of second sense electrodes 140A are spaced apart from one another in the horizontal direction on the plane, so that the blocks 141A, 142A, 143A, 144A and 145A of the plurality of second sense electrodes 140A are not in direct contact with one another.

The shape of the mesh pattern of the plurality of second sense electrodes 140A corresponds to the shape of the mesh pattern of the black matrix 120A in contact with the plurality of second sense electrodes 140A thereunder. Accordingly, the shape of the mesh pattern of the plurality of second sense electrodes 140A is substantially identical to that of the mesh pattern of the black matrix 120A.

The Black matrix 120A's width, $W_{BM}$, of the strands of the mesh pattern is equal to or larger than that of the mesh pattern of the plurality of second sense electrodes 140A formed on the black matrix 120A. Accordingly, the entirety of the mesh pattern of the plurality of second sense electrodes 140A is overlapped on and within the mesh pattern of the black matrix 120A. In FIG. 1B, the width of the strands of the mesh pattern of the plurality of second sense electrodes 140A is represented by the width $W_2$ which is the width of a strand of the block 145A.

Referring to FIGS. 1A and 1C, the insulation layer 150A is formed on the plurality of first sense electrodes 130A of the first sense unit and on the plurality of second sense electrodes 140A of the first sense unit. The insulation layer 150A is made of a transparent insulating material and is formed all over the surface of the substrate 110A as a single layer. The insulation layer 150A includes a plurality of openings to expose portions of the blocks 141A, 142A, 143A, 144A and 145A of the plurality of second sense electrodes 140A. For example, corresponding to the structure of FIG. 1C, two openings may be formed in the insulation layer 150A (previously illustrated in FIG. 1A) on each of the blocks 141A, 142A, 143A, 144A and 145A of the plurality of second sense electrodes 140A.

As shown in FIGS. 1A and 1C, an insulation layer 150A is formed the plurality of connection electrodes 160A. The plurality of connection electrodes 160A is made of a metal material. Each of the plurality of connection electrodes 160A electrically connects between adjacent sense electrodes among the blocks 141A, 142A, 143A, 144A and 145A of the plurality of second sense electrodes 140A via the openings in the insulation layer 150A. The plurality of connection electrodes 160A is formed above the black matrix 120A, specifically above the mesh pattern of the black matrix 120A. The connection electrodes 160A are formed above the black matrix 120A so that the connection electrodes overlap the black matrix 120A.

In the touch screen panel 100A according to the exemplary embodiment of the present disclosure, the plurality of first sense electrodes 130A of the first touch sense unit and the plurality of second sense electrodes 140A of the second touch sense unit are made of metal materials in a mesh pattern. Accordingly, compared to a touch screen panel employing transparent conductive oxide such as ITO, the touch screen panel 100A according to the exemplary embodiment of the present disclosure can have better flexibility, lower surface resistance, and higher transmissivity. In addition, cost for manufacturing the touch screen panel 100A can be reduced.

In addition, the touch screen panel 100A according to the exemplary embodiment of the present disclosure, the black matrix 120A is formed on the substrate 110A in a mesh pattern, and the plurality of first sense electrodes 130A and the plurality of second sense electrodes 140A, respectively, are formed on the mesh pattern of the black matrix 120A. Therefore, when a user views the touch screen panel 100A, that is, when the touch screen panel 100A is viewed from a side of the substrate 110A opposite to the side of the substrate 110A on which the black matrix 120A, the plurality of first sense electrodes 130A and the plurality of second sense electrodes 140A are formed, the plurality of first sense electrodes 130A and the plurality of second sense electrodes 140A made of a metal material are covered by the black matrix 120A. Further, the plurality of the connection electrodes 160A made of a metal material is also formed above the black matrix 120A and accordingly is covered by the black matrix 120A when a user views the touch screen panel 100A from a side of the substrate 110A opposite to the side of the substrate 110A on which the black matrix 120A is formed. Therefore, in the touch screen panel 100A according to the exemplary embodiment of the present disclosure, it is possible to prevent external light from being reflected on the plurality of first sense electrodes 130A, on the plurality of second sense electrodes 140A and on the plurality of connection electrodes 160A, which are made of metal materials. Accordingly, the metal materials are less visible to a user and thus the visibility of the touch screen panel 100A can be improved.

The touch screen panel 100A senses a user's touch input using the plurality of first sense electrodes 130A and the plurality of second sense electrodes 140A. For example, one of the plurality of first sense electrodes 130A and the plurality of second sense electrodes 140A may be a pattern of first-direction-sensing electrodes and the other one may be a pattern of second-direction-sensing electrodes. The pattern of first-direction-sensing electrodes senses a coordinate in the first direction (for example, the y-axis direction as illustrated in FIG. 1B) of a user's touch input. The pattern of second-direction-sensing electrodes senses a coordinate in the second direction (for example, the x-axis direction as illustrated in FIG. 1B) of the user's touch input. Accordingly, when a user's touch input is made on a position on the touch screen panel 100A, the touch screen panel 100A may determine the position of the user's touch input by combining the coordinate in the first direction sensed by the pattern of first-direction-sensing electrodes and the coordinate in the second direction sensed by the pattern of second-direction-sensing electrodes.

In this disclosure, one of the first touch sense unit and the second touch sense unit may be a pattern of sense electrodes to sense capacitance changes while the other one may be a pattern of drive electrodes to provide sense signals to detect the position of a touch input. When such a pattern of drive electrodes to provide sense signals is employed and sense signals to detect the position of the touch input are applied to drive electrodes around the position where the touch input is actually made, the largest value in the amount of capacitance change can be detected at the sense electrodes around the position where the touch input is actually made. In this manner, the touch screen panel 100A may determine the position of a user's touch input based on the sense signals provided by the drive electrode pattern and the amount of capacitance changes sensed by the sense electrode pattern.

Although not illustrated in FIGS. 1A to 1C, the substrate 110A may include an active area in which the plurality of first sense electrodes 130A and the plurality of second sense electrodes 140A are arranged, and a wiring area in which wiring is disposed that transmit signals to the plurality of first sense electrodes 130A and the plurality of second sense electrodes 140A, or transmit signals from the plurality of first sense electrodes 130A and from the plurality of second sense electrodes 140A to an IC, or the like.

In FIG. 1A, the insulation layer 150A is formed on all over the surface of the substrate 110A as a single layer. However, the insulation layer 150A may be formed so that it has the same pattern as the mesh pattern of the black matrix 120A. In this instance, the insulation layer 150A may be formed to overlap the black matrix 120A.

In addition, the insulation layer 150A may be formed to include a plurality of insulation patterns. In this instance, the plurality of insulation patterns of the insulation layer 150A may be formed where the plurality of first sense electrodes 130A and the plurality of connection electrodes 160A overlap on the plurality of first sense electrodes 130A and on the plurality of second sense electrodes 140A. Each of the plurality of insulation patterns may have two openings to electrically connect between adjacent ones of the blocks 141A, 142A, 143A, 144A and 145A of the plurality of second sense electrodes 140A.

In FIGS. 1B and 1C, the plurality of second sense electrodes 130A and the plurality of second sense electrodes 140A are indicated with different hatched lines from those of the plurality of connection electrodes 160A, for the purpose of clarity. However, the plurality of first sense electrodes 130A, the plurality of second sense electrodes 140A, and the plurality of connection electrodes 160A may be made of the same material.

Figure 1D:
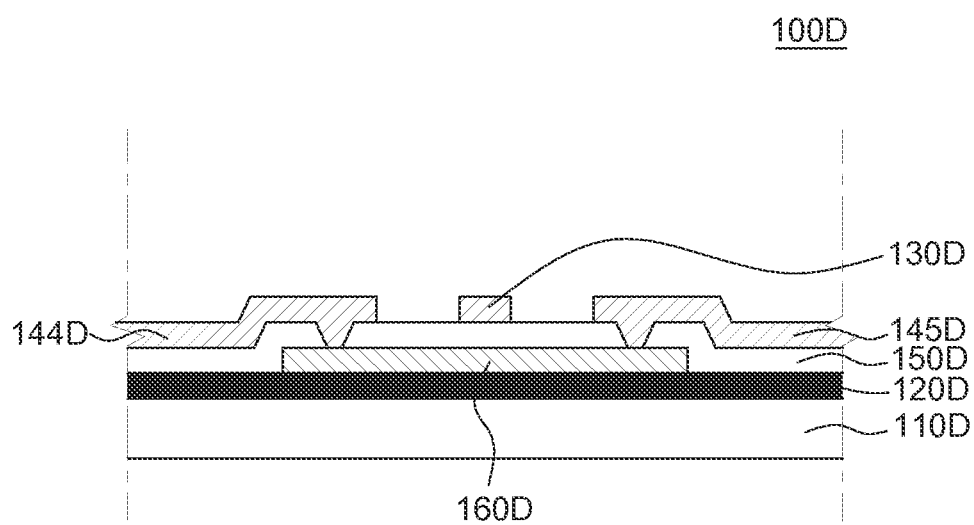
FIG. 1D is a cross-sectional view of a touch screen panel according to an exemplary embodiment of the present disclosure in which the first and second touch sense units, an insulation layer, and connection electrodes are stacked in a different manner from that of the touch screen panel illustrated in FIG. 1C.

FIG. 1D is a cross-sectional view of a touch screen panel according to an exemplary embodiment of the present disclosure in which a first touch sense unit, a second touch sense unit, an insulation layer, and connection electrodes are stacked in a different manner from that of the touch screen panel illustrated in FIG. 1C. The touch screen panel 100D illustrated in FIG. 1D has the substantially identical stacking structure as the stacking structure of the touch screen panel 100A described above with respect to FIGS. 1A to 1C, except for the stacking structure of a plurality of first sense electrodes 130D, a plurality of second sense electrodes 140D, and a plurality of connection electrodes 160D. Therefore, redundant descriptions on the like elements will not be made.

Referring to FIG. 1D, on the black matrix 120D is formed the plurality of connection electrodes 160D. On the plurality of connection electrodes 160D is formed the insulation layer 150D. The insulation layer 150D has a plurality of openings to expose portions of the plurality of connection electrodes 160D. On the insulation layer 150D are formed the plurality of first sense electrodes 130D and the plurality of second sense electrodes 140D. The plurality of connection electrode 160D electrically connects between adjacent ones of the blocks 144D and 145D via the openings in the insulation layer 150D. In the touch screen panel 100A illustrated in FIGS. 1A to 1C, the black matrix 120A, the plurality of first sense electrodes 130A and the plurality of second sense electrodes 140A, the insulation layer 150A, and the plurality of the connection electrodes 160A are formed on the substrate 110A in this order. In contrast, in the touch screen panel 100D illustrated in FIG. 1D, the black matrix 120D, the plurality of the connection electrodes 160D, the insulation layer 150D, and the first and second touch sense units 130D and 140D are stacked on the substrate 110D in this order.

Figure 1E:
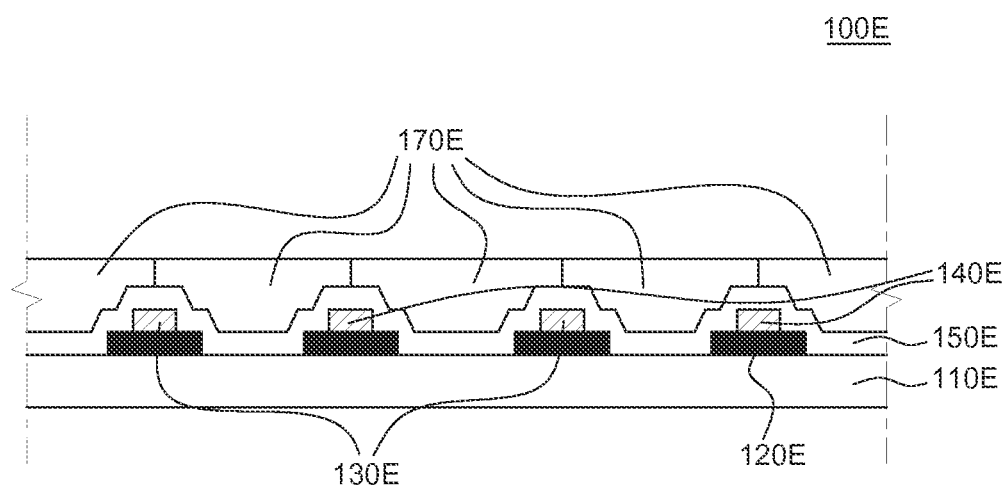
FIG. 1E is a cross-sectional view for illustrating a color filter of a touch screen panel according to an exemplary embodiment of the present disclosure, taken along the line Ie-Ie' of FIG. 1B.

FIG. 1E is a cross-sectional view for illustrating a color filter of a touch screen panel according to an exemplary embodiment of the present disclosure, taken along the line Ie-Ie' of FIG. 1B. The touch screen panel 100E illustrated in FIG. 1E is substantially identical to the touch screen panel 100A described above with respect to FIGS. 1A to 1C, except that the former further includes a color filter 170E. Therefore, redundant descriptions on the like elements will not be made.

On the substrate 110E of the touch screen panel 100E is formed the color filter 170E. Specifically, when an insulation layer 150E is formed on all over the surface of the substrate 110E as illustrated in FIG. 1E, the color filter 170E is formed on the insulation layer 150E. The color filter 170E is to change the color of light from a display panel attached on the touch screen panel 100E. The color filter 170E may include a red color filter 170E, a green color filter 170E and a blue color filter 170E.

When a touch screen panel and a display panel are produced separately and then are attached together as discussed in the Summary, the thickness of a display device is increased since it requires an additional substrate. Further, it is not beneficial in terms of design. In view of this, in the touch screen panel 100E according to an exemplary embodiment of the present disclosure, the color filter 170E is formed on the substrate 110E where the black matrix 120E, the plurality of first sense electrodes 130E and plurality of second sense electrodes 140E are formed. Accordingly, the touch screen panel 100E and the display panel can be implemented integrally.

In FIG. 1E, the insulation layer 150E is formed all over the surface of the substrate 110E as a single layer, and the color filter 170E is formed on the insulation layer 150E. However, when the insulation layer 150E is formed in the same pattern as the mesh pattern of the black matrix 120E or when the insulation layer 150E is formed to include a plurality of insulation patterns, the color filter 170E may fill space between the mesh pattern of the plurality of first sense electrodes 130E and the mesh pattern of the plurality of second sense electrodes 140E.

Although not illustrated in FIG. 1E, a protection layer may be formed below the color filter 170E so as to protect the plurality of first sense electrodes 130E, the plurality of second sense electrodes 140E and a plurality of connection electrodes 160E during the processing of the color filter 170E.

Figure 2A:
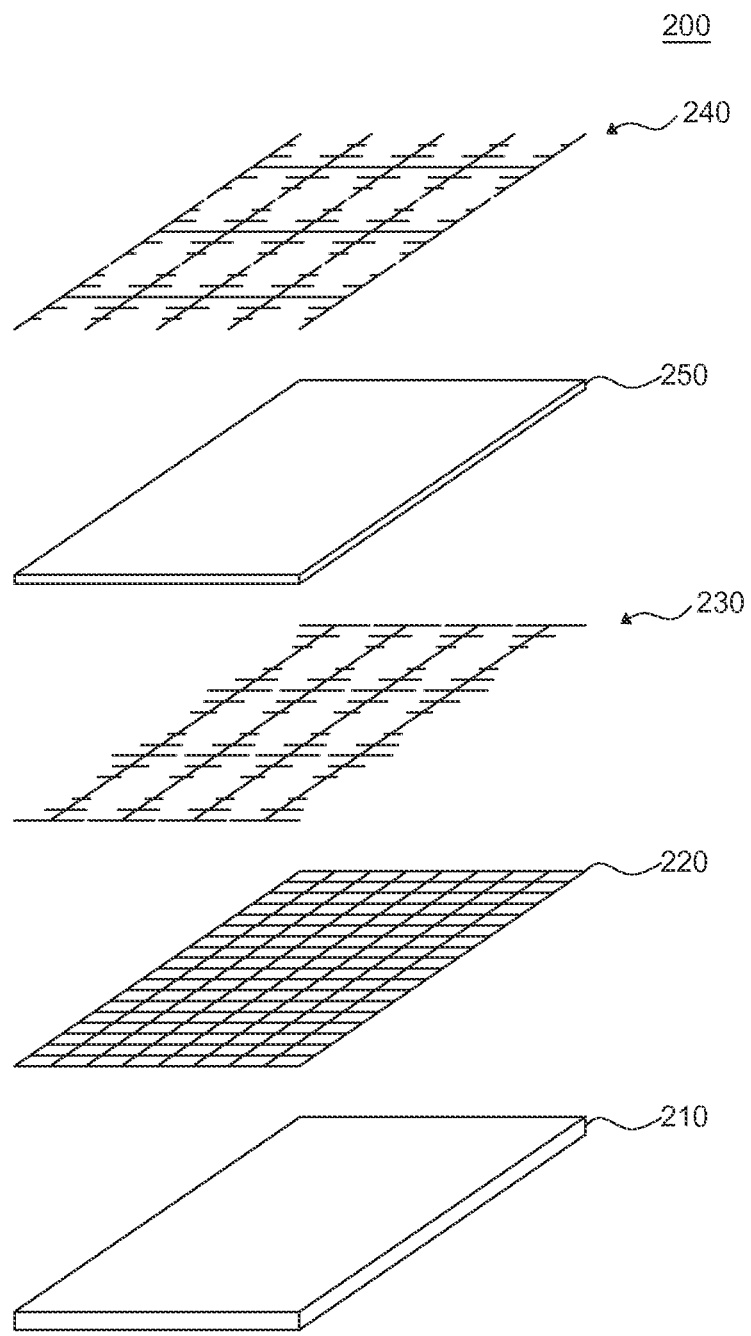
FIG. 2A is an exploded perspective view for illustrating a touch screen panel having the first and second sense units formed on different planes, according to an exemplary embodiment of the present disclosure.

FIG. 2A is an exploded perspective view for illustrating a touch screen panel having a first touch sense unit and a second touch sense unit formed on different planes, according to an exemplary embodiment of the present disclosure. Referring to FIG. 2A, a touch screen panel 200 includes a substrate 210, a black matrix 220, a first touch sense unit comprising a plurality of first sense electrodes 230, an insulation layer 250, and a second touch sense unit comprising a plurality of second sense electrodes 240. The touch screen panel 200 illustrated in FIG. 2A is substantially identical to the touch screen panel 100A described above with respect to FIGS. 1A to 1C, except that blocks 241, 242, 243, 244, and 245 of the plurality of second sense electrodes 240 are connected to one another in a second direction, that the plurality of second sense electrodes 240 is formed on the insulation layer 250, and that a plurality of connection electrodes are not employed. Therefore, redundant descriptions on the like elements will not be made.

Figure 2B:
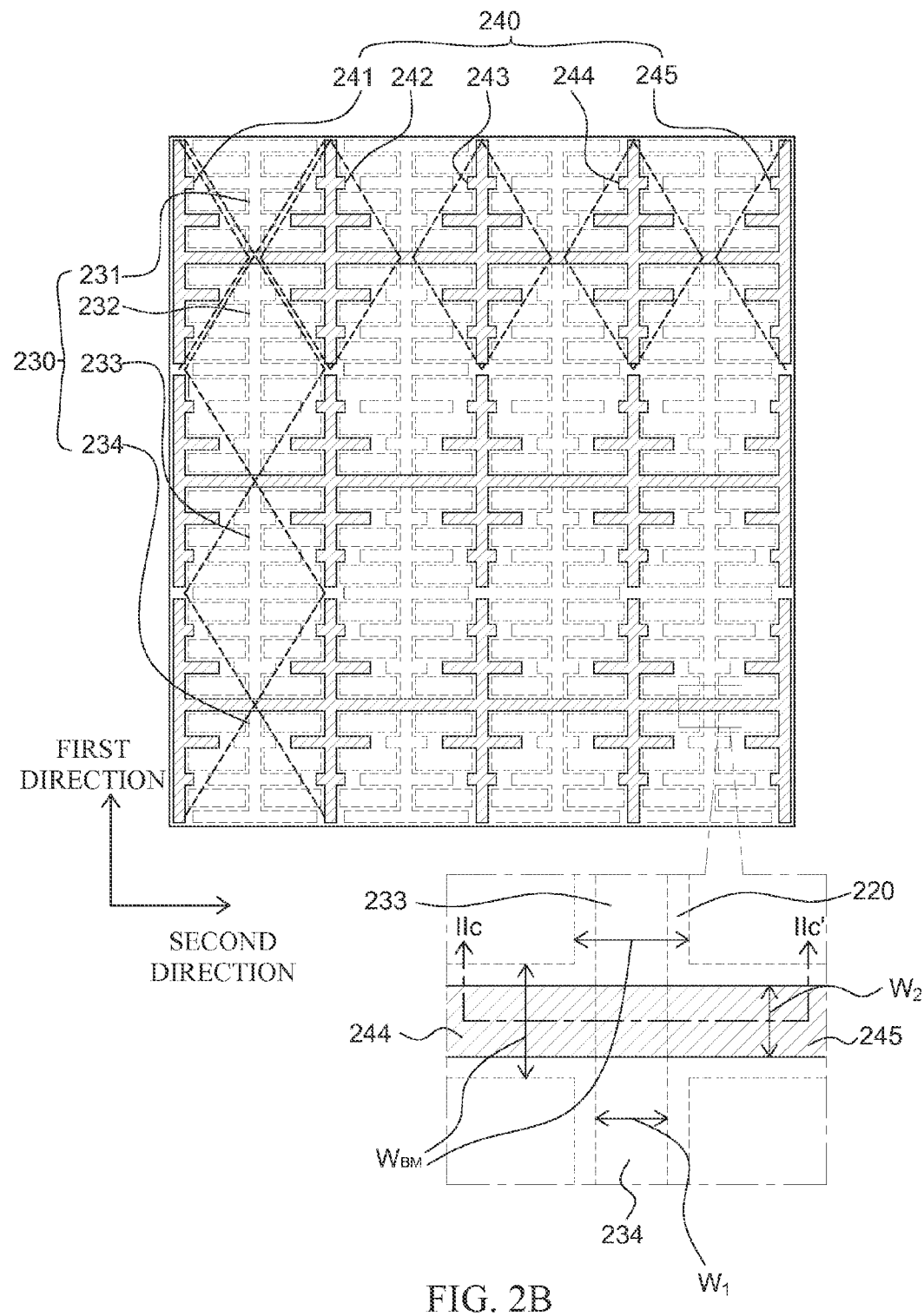
FIG. 2B is a pair of views, one of which is a plan view of the touch screen panel illustrated in FIG. 2A and the other of which is an enlarged view of a portion thereof.
Figure 2C:
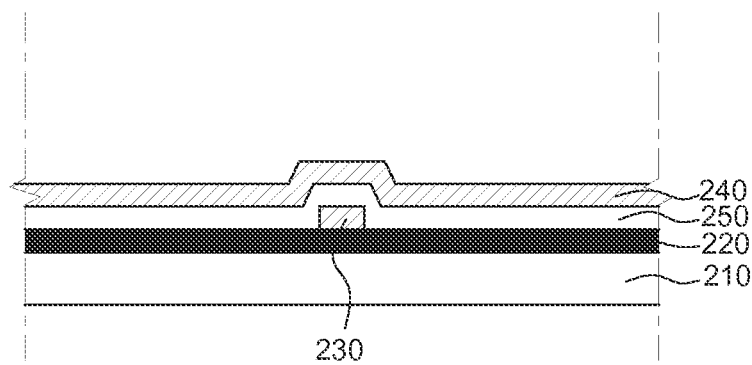
FIG. 2C is a cross-sectional view of the touch screen panel taken along the line IIc-IIc' of FIG. 2B for illustrating the first and second touch sense units, and the insulation layer.

Referring to FIG. 2A, the black matrix 220 is formed on the substrate 210 in a mesh pattern. On the black matrix 220 is formed the plurality of first sense electrodes 230. On the plurality of first sense electrodes 230 is formed the insulation layer 250. On the insulation layer 250 is formed the plurality of second sense electrodes 240. That is, the plurality of first sense electrodes 230 and the plurality of second sense electrodes 240 are formed on different planes, and are optionally separated by the insulating layer 250. Reference is made to FIGS. 2B and 2C in order to describe in more detail the substrate 210, the black matrix 220, the first touch sense unit comprising a plurality of first sense electrodes 230, the second touch sense unit comprising a plurality of second sense electrodes 240, the insulation layer 250, and the plurality of connection electrodes 260.

FIG. 2B is a pair of views, one of which is a plan view of the touch screen panel illustrated in FIG. 2A and the other of which is an enlarged view of a portion thereof. FIG. 2C is a cross-sectional view of the touch screen panel taken along line IIc-IIc' of FIG. 2B for illustrating the first touch sense unit, the second touch sense unit, and the insulation layer. In FIG. 2B, for the purpose of simplicity, the substrate 210 and the insulation layer 250 are omitted therefrom. Further, the plurality of second sense electrodes 240 disposed on the insulation layer 250 is indicated by solid lines, and the second touch sense unit 140A disposed under the insulation layer 250 is indicated by dashed lines.

On the black matrix 220 is formed the plurality of first sense electrodes 230. Specifically, the plurality of first sense electrodes 230 (e.g., comprising the blocks 231, 232, 233, and 234 of the plurality of first sense electrodes 230) are formed in a mesh pattern and extended in a first direction on the black matrix 220. The shape of the mesh pattern of the plurality of first sense electrodes 230 corresponds to the shape of the mesh pattern of the black matrix 220 in contact with the plurality of first sense electrodes 230 thereunder. The width $W_{BM}$ of the mesh pattern of the black matrix 220 is equal to or larger than the width $W_1$ of the mesh pattern of the plurality of first sense electrodes 230. The plurality of first sense electrodes 230 is made of a metal material.

On the plurality of first sense electrodes 230 is formed the insulation layer 250. The insulation layer 250 is made of a transparent insulating material and is formed all over the surface of the substrate 210 as a single layer. In some embodiments, the insulation layer 250 does not include openings, unlike the insulation layer 150A of FIG. 1A.

On the insulation layer 250 is formed the plurality of second sense electrodes 240. Specifically, the blocks 241, 242, 243, 244, and 245 of the plurality of second sense electrodes 240 formed in a mesh pattern are connected to one another in a second direction above the black matrix 220. The shape of the mesh pattern of the plurality of second sense electrodes 240 corresponds to the shape of the mesh pattern of the black matrix 220 in contact with the plurality of second sense electrodes 240 thereunder. A pattern of the first touch sense unit and a pattern of the second touch sense unit collectively form substantially the same pattern of the black matrix. That is, the mesh pattern of the plurality of first sense electrodes 230 and the mesh pattern of the plurality of second sense electrodes 240 collectively form substantially the same mesh pattern of the black matrix. The width $W_{BM}$ of the mesh pattern of the black matrix 220 is equal to or larger than the width $W_2$ of the mesh pattern of the plurality of second sense electrodes 240. The plurality of second sense electrodes 240 is made of a metal material which may be the same material as that of the plurality of first sense electrodes 230.

At the portions where the second touch sense unit 240 overlaps the plurality of first sense electrodes 230, the plurality of first sense electrodes 230 and the plurality of second sense electrodes 240 are separated by the insulation layer 250 therebetween.

In the touch screen panel 200 according to the exemplary embodiment of the present disclosure, the plurality of first sense electrodes 230 and the plurality of second sense electrodes 240 are formed on different planes while the mesh pattern of the plurality of first sense electrodes 230 and the mesh pattern of the plurality of second sense electrodes 240 both are formed above and within the mesh pattern of the black matrix 220. Therefore, in the touch screen panel 200 according to the exemplary embodiment of the present disclosure, it is possible to prevent external light from being reflected on the plurality of first sense electrodes 230 and on the plurality of second sense electrodes 240, which are made of metal materials. Accordingly, the metal materials are less visible to a user and thus the visibility of the touch screen panel 100A can be improved.

In FIG. 2C, the insulation layer 250 is formed all over the surface of the substrate 210 as a single layer. However, the insulation layer 250 may be formed so that it has the same pattern as the mesh pattern of the black matrix 220. In this instance, the insulation layer 250 may be formed to overlap the black matrix 220.

In addition, the insulation layer 250 may be formed to include a plurality of insulation patterns. In this instance, the insulation patterns of the insulation layer 250 may be formed between the plurality of first sense electrodes 230 and the plurality of second sense electrodes 240 at the positions where the plurality of first sense electrodes 230 and the plurality of second sense electrodes 240 overlap.

Figure 3:
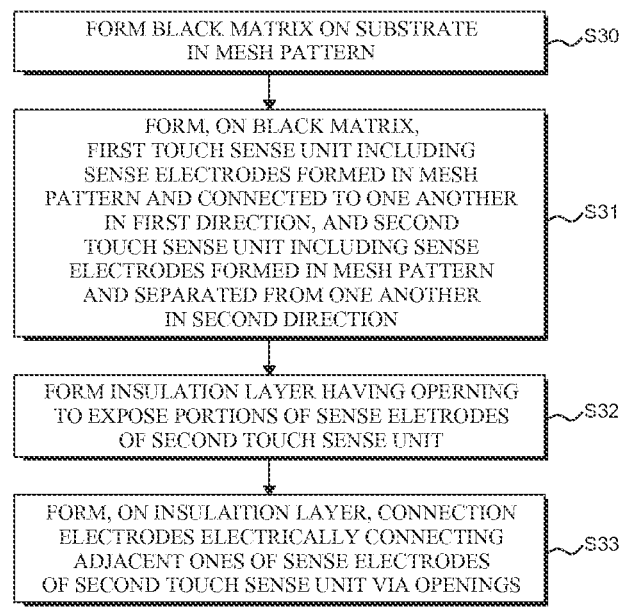
FIG. 3 is a flow chart for illustrating a method of manufacturing a touch screen panel according to an exemplary embodiment of the present disclosure.

FIG. 3 is a flow chart for illustrating a method of manufacturing a touch screen panel having first and second touch sense units formed on the same plane according to an exemplary embodiment of the present disclosure.

Initially, a black matrix is formed on a substrate in a mesh pattern (S30).

The substrate is to support and protect a variety of elements on a touch screen panel and may be made of a transparent material such as glass or plastic.

The black matrix is made of a material capable of absorbing light from the outside and may be formed as a chrome (Cr) monolayer, a chrome/chrome oxide (Cr/CrOx) bilayer and of resin containing carbon pigments, black dyes or the like. In order to form the black matrix in a mesh pattern, the above-listed materials are formed all over the surface of the substrate via deposition, sputtering or various types of coating. Then, the material formed all over the surface of the substrate is patterned, leaving a mesh pattern.

Subsequently, a first touch sense comprising a plurality of first sense electrodes in the mesh pattern and a second touch sense unit comprising a plurality of second sense electrodes in the mesh pattern are separated from one another and are formed (S31).

In order to form the first touch sense unit and the second touch sense unit, metal materials are formed all over the surface of the substrate via deposition, sputtering or various types of coating. Then, the metal materials formed all over the surface of the substrate are patterned, leaving the mesh pattern of sense electrodes of the first touch sense unit and the mesh pattern of the sense electrodes of the second touch sense unit on the black matrix. In this manner, the first and second touch sense units can be formed together.

Subsequently, an insulation layer is formed that includes a plurality of openings to expose portions of the blocks of the plurality of second sense electrodes (S32).

In order to form the insulation layer, a transparent material is formed all over the surface of the substrate via deposition, sputtering or various types of coating. Then, the transparent material is patterned so that the openings to expose portions of the sense electrodes of the second touch sense unit are formed.

Subsequently, on the insulation layer, a plurality of connection electrodes is formed that electrically connects between adjacent ones of the blocks of the plurality of second sense electrodes via the openings (S33).

In order to form the plurality of connection electrodes, a metal material is formed on the insulation layer via deposition, sputtering or various types of coating. Then, the metal material is patterned, leaving portions corresponding to the plurality of connection electrodes.

Subsequently, a color filter may be formed that fills space between the mesh pattern of the first touch sense unit and the mesh pattern of the second touch sense unit. Forming the color filter may mean filling space between the mesh pattern of the first touch sense unit and the mesh pattern of the second touch sense unit with a resin material containing pigments or dyes of a particular color.

Alternatively, forming the insulation layer may mean patterning a transparent insulation material into a plurality of insulation pattern. That is to say, insulation pattern that has openings to electrically connect between adjacent ones of the blocks of the plurality of second sense electrodes may be formed at positions where the plurality of first sense electrodes and the plurality of connection electrodes overlap on the plurality of first sense electrodes and on the plurality of second sense electrodes.

The present disclosure has been described in more detail with reference to the exemplary embodiments, but the present invention is not limited to the exemplary embodiments. It will be apparent to those skilled in the art that various modifications can be made without departing from the technical sprit of the disclosure. Accordingly, the exemplary embodiments disclosed in the present invention are used not to limit but to describe the technical spirit of the present invention, and the technical spirit of the present invention is not limited to the exemplary embodiments. Therefore, the exemplary embodiments described above are considered in all respects to be illustrative and not restrictive. The protection scope of the present invention must be interpreted by the appended claims and it should be interpreted that all technical spirits within a scope equivalent thereto are included in the appended claims of the present invention.

What is claimed is:
1. A touch screen panel, comprising:
a substrate;
a black matrix on the substrate in a mesh pattern;
a first touch sense electrode on the black matrix, the first touch sense electrode extending in a first direction;
a plurality of second touch sense electrodes on the black matrix, each of the second touch sense electrodes having a plurality of blocks extending in a second direction;
an insulation layer with openings to expose portions of the second touch sense electrodes; and
a connection electrode directly connecting adjacent second touch sense electrodes separated in the second direction via the openings in the insulation layer,
wherein the first touch sense electrode and the second touch sense electrode are covered by the mesh pattern of the black matrix,
wherein the first touch sense electrode and each of the plurality of blocks in each of the second touch sense electrodes include a plurality of electrode branches for touch sensing, at least one of the electrode branches have a length different from another of the electrode branches,
wherein the connection electrode is interposed between the black matrix and the insulation layer, and
wherein the first touch sense electrode and the second touch sense electrodes are at a same side of the insulation layer.

2. The touch screen panel according to claim 1, wherein the electrode branches of the first touch sense electrode are insulated from the electrode branches of the blocks in each of the second touch sense electrodes.

3. The touch screen panel according to claim 2, wherein at least one of the branches in a block of each of the second touch sense electrodes has an exposed portion via the openings in the insulation layer.

4. The touch screen panel according to claim 1, wherein the first touch sense electrode and the second touch sense electrodes are located in the same plane.

5. The touch screen panel according to claim 4, wherein the first touch sense electrode and the second touch sense electrodes are interposed between the black matrix and the insulation layer, and wherein the connection electrode is on the insulation layer.

6. The touch screen panel according to claim 1, wherein the insulation layer has substantially a same pattern as the mesh pattern of the black matrix.

7. The touch screen panel according to claim 1, wherein the insulation layer has a pattern that exposes at least some portion of the second touch sense electrodes other than the openings.

8. The touch screen panel according to claim 7, wherein the insulation layer is positioned in an area where the first touch sense electrode and the connection electrode overlap each other, insulating the first electrode from the connecting electrode.

9. The touch screen panel according to claim 1, wherein a width of the black matrix is equal to or larger than a width of the first touch sense electrode and equal to or larger than a width of each of the second touch sense electrodes.

10. The touch screen panel according to claim 1, wherein the first touch sense electrode, the second touch sense electrodes, and the connection electrode are made of a metal material.

11. The touch screen panel according to claim 1, wherein the connection electrode overlaps, in part, the mesh pattern of the black matrix.

12. A touch screen panel, comprising:
a substrate;
a black matrix on the substrate in a mesh pattern;
a first touch sense unit comprising a plurality of first sense electrodes extending in a first direction;
a second touch sense unit comprising a plurality of second touch sense electrodes extending in a second direction; and
an insulation layer interposed between the first touch sense unit and the second touch sense unit, the insulation layer having the same pattern as the mesh pattern of the black matrix,
wherein the first touch sense unit and the second touch sense unit are covered under the mesh pattern of the black matrix, and each of the first touch sense electrodes and each of the second touch sense electrodes includes a plurality of electrode branches for touch sensing, a subset of the plurality of electrode branches having lengths different from each other.

13. The touch screen panel according to claim 12, wherein the insulation layer exists in an area where the first touch sense electrodes and the second touch sense electrodes overlap each other.

14. The touch screen panel according to claim 12, wherein a pattern of the first touch sense unit and a pattern of the second touch sense unit collectively form substantially a same pattern as the mesh pattern of the black matrix.

15. The touch screen panel according to claim 12, wherein a width of the black matrix is equal to or larger than a width of the first touch sense electrode and a width of the second touch sense electrode.

16. The touch screen panel according to claim 12, wherein the first touch sense electrode and the second touch sense electrode are made of a metal material.

17. The touch screen panel according to claim 1, wherein the connection electrode is in contact with the electrode branches of the adjacent blocks of the second touch sense electrodes.

18. The touch screen panel according to claim 1, wherein the plurality of electrode branches include a center electrode branch, a first group of electrode branches at one side of the center electrode branch and a second group of electrode branches at the other side of the center electrode branch, and
the first group of electrode branches is symmetric about the center electrode branch relative to the second group of electrode branches.

* * * * *